(12) United States Patent
Toyoda et al.

(10) Patent No.: US 6,778,302 B2
(45) Date of Patent: Aug. 17, 2004

(54) HOLOGRAPHIC STEREOGRAM PRINTING SYSTEM, HOLOGRAPHIC STEREOGRAM PRINTING METHOD AND HOLOGRAPHING DEVICE

(75) Inventors: Takahiro Toyoda, Tokyo (JP); Nobuhiro Kihara, Kanagawa (JP); Akira Shirakura, Tokyo (JP)

(73) Assignee: Sony Corporation (JP)

( * ) Notice: Subject to any disclaimer, the term of this patent is extended or adjusted under 35 U.S.C. 154(b) by 2 days.

(21) Appl. No.: 10/359,207

(22) Filed: Feb. 6, 2003

(65) Prior Publication Data

US 2003/0137705 A1 Jul. 24, 2003

Related U.S. Application Data

(63) Continuation of application No. 09/795,446, filed on Mar. 1, 2001, now Pat. No. 6,559,983.

(30) Foreign Application Priority Data

Mar. 2, 2000 (JP) ..................................... P2000-061872

(51) Int. Cl.[7] ................................................ G03H 1/26
(52) U.S. Cl. ............................. 359/23; 359/9; 359/462
(58) Field of Search .............................. 359/23, 9, 462, 359/466–470

(56) References Cited

U.S. PATENT DOCUMENTS

| | | |
|---|---|---|
| 3,011,920 A | 12/1961 | Shipley, Jr. |
| 4,169,171 A | 9/1979 | Narcus |
| 4,532,152 A | 7/1985 | Elarde |
| 4,976,990 A | 12/1990 | Bach et al. |
| 5,178,682 A | 1/1993 | Tsukamoto et al. |
| 5,446,330 A | 8/1995 | Eda et al. |
| 5,674,787 A | 10/1997 | Zhao et al. |
| 5,696,207 A | 12/1997 | Vargo et al. |
| 5,705,230 A | 1/1998 | Matanabe et al. |
| 5,837,662 A | 11/1998 | Chai et al. |
| 5,892,602 A | 4/1999 | Sirat |
| 6,138,095 A | 10/2000 | Gupta et al. |
| 6,292,277 B1 | 9/2001 | Kikinis |
| 6,600,580 B2 | 7/2003 | Kihara et al. |
| 2001/0021474 A1 * | 9/2001 | Hamada ........................ 430/1 |

FOREIGN PATENT DOCUMENTS

JP                 2000-078451            3/2000

* cited by examiner

*Primary Examiner*—Drew Dunn
*Assistant Examiner*—Fayez Assaf
(74) *Attorney, Agent, or Firm*—Rader, Fishman & Grauer PLLC; Ronald P. Kananen (57) ABSTRACT

A holographic stereogram printing system to print holographic stereograms with good efficiency and no drop in the operating rate of the imaging system and holographic printer. An imaging system control section of an imaging system comprises an operating section that along with controlling the operation of the camera according to the desired selection of the user such as imaging method, image size selection or image layout, also creates an information management file for the base image based on the control information. A holographic stereogram printer prints out a holographic stereogram according to the information management file provided along a transmission path.

4 Claims, 7 Drawing Sheets

FIG.2

| 4 | 42 | 33 | 2 | 130 | 2 | 43 |
|---|---|---|---|---|---|---|
| IMAGE DATA IDENTIFICATION ID | IMAGING INFORMATION | APL INFORMATION | COMPOSITE IMAGE INFORMATION | CHARACTER INFORMATION | PRINT COUNT INFORMATION | RESERVED |

HOLOGRAPHIC STEREOGRAM PRINTING SYSTEM, HOLOGRAPHIC STEREOGRAM PRINTING METHOD AND HOLOGRAPHING DEVICE

This application is a continuation of application Ser. No. 09/795,446, filed on Mar. 1, 2001 now U.S. Pat. No. 6,559,983.

BACKGROUND OF THE INVENTION

1. Field of the Invention

The present invention relates to a holographic stereogram printing system, hologram printing method and an imaging device for printing out holographic stereograms recorded on a hologram recording medium.

2. Description of the Related Art

A holographic stereogram is made for example by using a plurality of images as a base image obtained from an object sequentially captured from different viewing points, and recording these images in sequence in rectangular or dot shaped hologram elements on one hologram recording medium.

Figure 6:
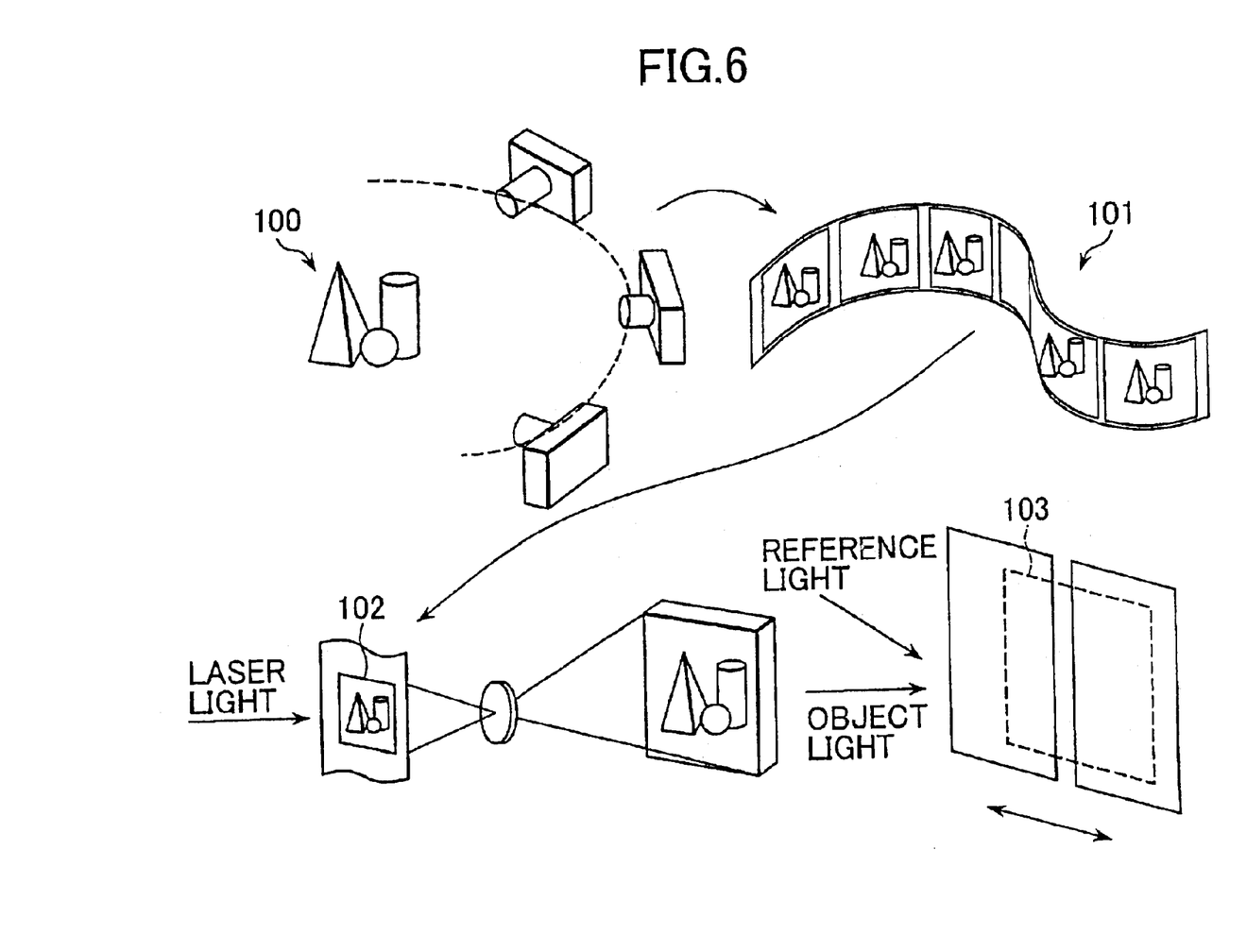
FIG. 6 is a block diagram describing the system of the related art for making a holographic stereogram.

When for example making a holographic stereogram possessing only parallax information in lateral directions, a parallax image row 101 is obtained consisting of a plurality of images having parallax information in the lateral directions, by sequentially capturing images of an object 100 from laterally different viewing points as shown in FIG. 6. Each of the images 102 comprising the parallax image row 101 is then recorded in sequence as consecutive rectangular hologram elements in the lateral direction on the recording medium 103. A holographic stereogram possessing parallax information in the lateral directions is acquired in this way.

In this holographic stereogram, the plurality of images 102 acquired by capturing sequential images from laterally different viewing points are sequentially recorded as rectangular hologram elements in the lateral direction so that when a person views the holographic stereogram with both eyes, different pieces of two-dimensional information are seen respectively by the right eye and the left eye. The person perceives a parallax (or visual difference in angle) creating a three-dimensional image.

Besides the above, many studies also have been made of three-dimensional display technology utilizing holographic stereograms. A printer system for making holographic stereograms also has been disclosed (A. Shirakura; N. Kihara; S. Baba: "Instant holographic portrait printing system", Proc. SPIE Vol. 3293, p.246–253, Practical Holography XII).

Figure 7:
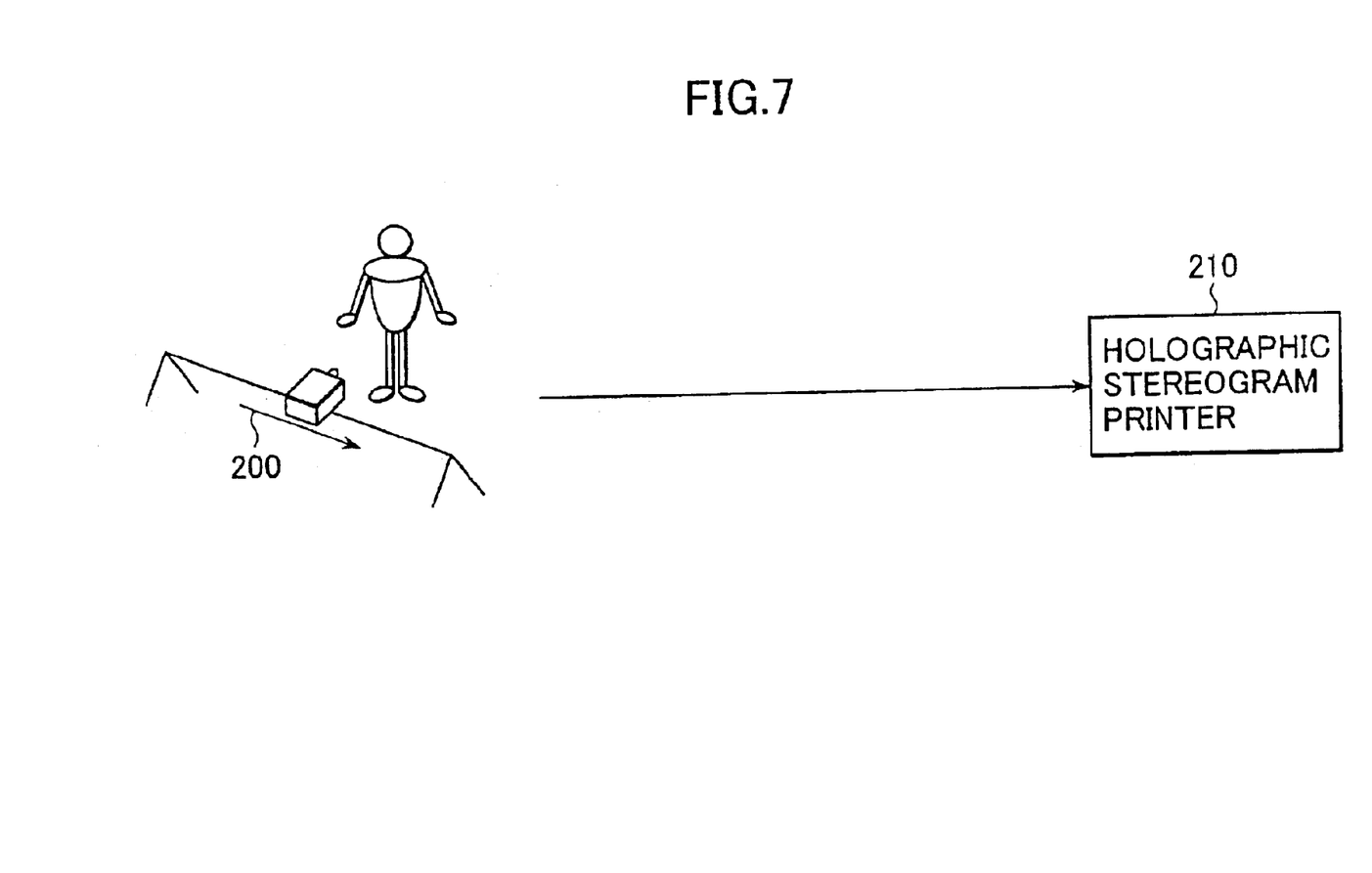
FIG. 7 is a drawing describing an example of applying the holographic stereogram printing system to portraits.

An example of technology applying a holographic stereogram printing system to portraits, (A. Shirakura; N. Kihara; S. Baba: "Instant holographic portrait printing system", Proc. SPIE Vol. 3293, p.246–253, Practical Holography XII) is shown in FIG. 7. In the example shown here, the imaging (photographing) with the imaging system 200 requires 7.5 seconds, the hologram printing with the holographic printer 210 requires 180 seconds and the subsequent processing requires 10 minutes. Assuming for instance that this system is operated at an amusement park, with one holographic printer 210 for the imaging system 200, the operating rate for the imaging system will of course decline. Also, if for some reason the imaging time for the imaging system 200 takes longer than the holographic printing by the holographic printer 210 then the operating rate of the holographic printer will worsen.

Further, when printing data such as from the Internet by using this system, contriving some means to sequentially store and print out many image data is required.

SUMMARY OF THE INVENTION

In view of the above problems with the related art, this invention has the objective of providing a holographic stereogram printing system and hologram printing method to print holographic stereograms with good efficiency and without a drop in the operating rate of the imaging system and the holographic printer. This invention has the further objective of providing an imaging device capable of making print outs of holographic stereograms on a holographic printer with good efficiency.

In order to achieve the above objectives., the holographic stereogram printing system of this invention comprises a base image provision means to provide a control information file relating to the base image used in the hologram and the base image, a transmission path to transmit the base image and control information file from the base image provision means, and a printing means to make printouts of the holographic. stereograms based on the base image according to the control information file.

The holographic stereogram printing system of this invention is further comprised of a plurality of base image provision means to provide control information files relating to the base image and that base image used in the hologram, a network means for transferring and apportioning the base image and control information files from the plurality of base image provision means, and a plurality of printing means to make printouts of the holographic stereograms based on the base image according to the control information file apportioned from the plurality of base image provision means.

The holographic stereogram printing system of this invention is yet further comprised of an image processing means for specified processing on said base image provided from the base image provision means by way of the transmission path, and the printing; means makes printouts of the row of images subjected to the specified processing by the image processing means according to the control information file.

In other words, this is a system wherein a plurality of camera units or data from a network, such as the Internet, are collected in an image distribution means such as a computer, and the collected image data are assigned appropriately to a plurality of holographic printers to print the holographic stereograms.

Also, ID numbers are assigned to each data by the server computer to make specifying what image has become what holographic stereogram easy, and embedding these ID numbers in the image of the holographic stereogram proves convenient during actual use.

DETAILED DESCRIPTION OF THE INVENTION

The embodiments of the invention are next described while referring to the accompanying drawings. The invention is not limited by the following examples and optional changes in the structure may be made without departing from the scope or substance of the invention.

Figure 1:
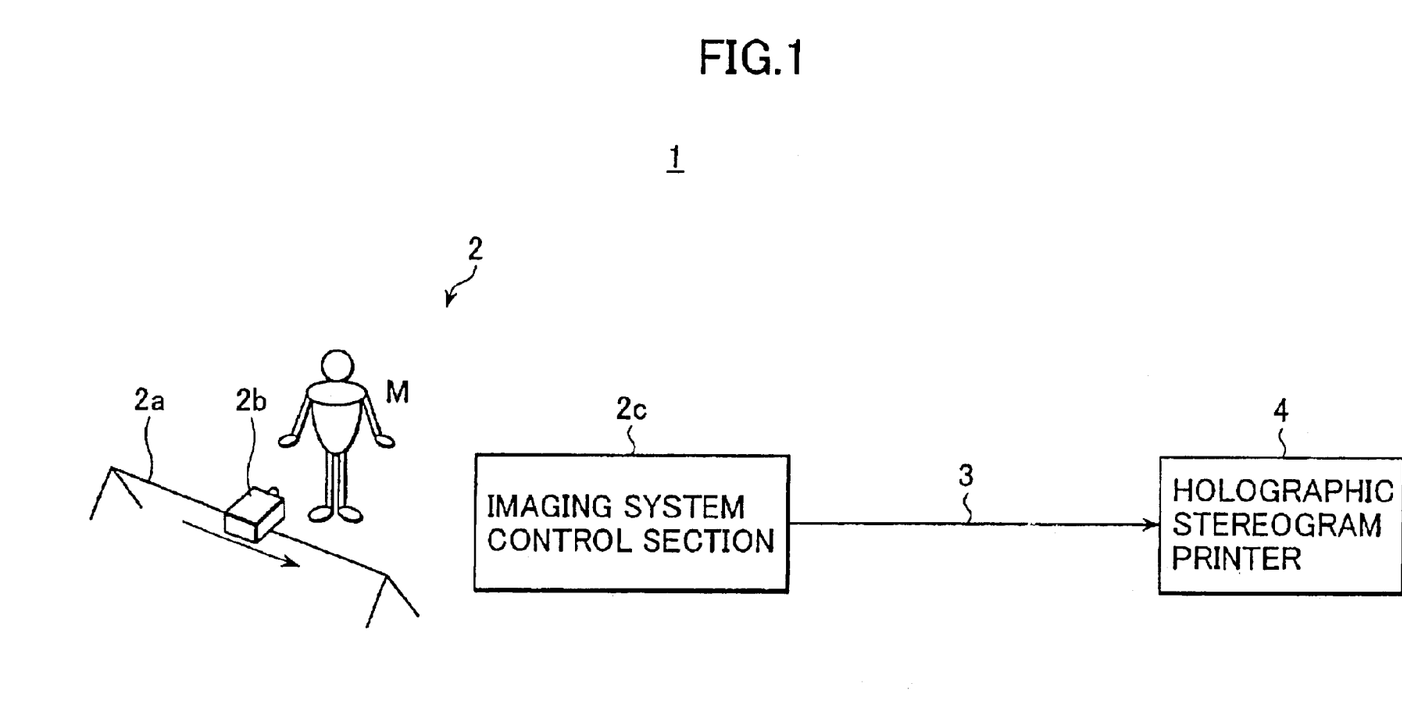
FIG. 1 is a block diagram showing the structure of the holographic stereogram printing system according to the first embodiment of the invention.

A holographic stereogram printing system 1 of FIG. 1 is explained first. In this holographic stereogram printing systems 1, an imaging system 2 to photograph (image capture a hologram base image, and one hologram printer 4 to make print outs of the holographic stereogram are connected by a transmission path 3.

The imaging system 2 may for instance be a camera moving in a straight line along an image capture track to rapture images of an object or may be rotating during the image capture and capable of panning, etc. Here, as shown in FIG. 1, a camera 2b moves along the image capture track 2a while fixed to face the target object M, and a base image is acquired utilizing the imaging system 2 by multiple image capture of the object M from different positions. The imaging system is controlled by the imaging control section 2c according to user operation, and a control information file created in the imaging system 2 is added to the base image. The control information file holds all types of information relating to the base image and contains main elements such as identification numbers. A more detailed description is related later on, however a format consisting of an identification number added to information relating to attributes such as the base image and image capture conditions when the base image was photographed (image captured) by means of the imaging system 2 is listed.

The transmission path 3 sends the base image and the control information file to the hologram printer 4 from the imaging system 2. The hologram printer 4 makes printouts of the holographic stereogram based on the base image according to the control information file provided by way of the transmission path 3. The look-up table, image brightness and the aspect ratio are optimized based on the image capture (photography) conditions listed in the control information file, and holographic stereogram exposure performed.

The imaging control section 2c comprises an operating section, and controls operation of the camera 2b according to the selections desired by the user such as selection of the image capture method, selection of image size, and selection of image capture layout. The imaging control section 2c also creates a control information file. A specific example of the control information contained in this control information file is explained while referring to FIG. 2 and Table 1 described later on.

Figure 2:
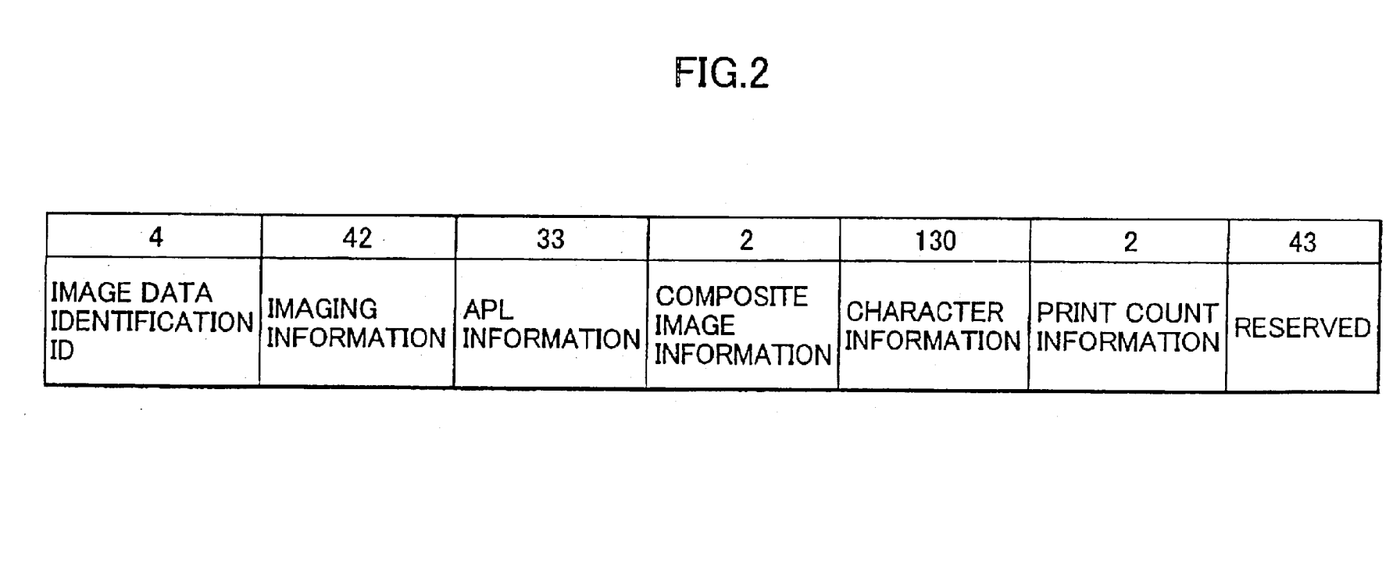
FIG. 2 is a drawing of the format of the control information file.

Control information consists of a 4 byte image data identification ID, a 42 byte image capture information, a 33 byte application (APL) information, a 2 byte composite image information, a 130 byte character information, and a 2 byte print count information as shown in FIG. 2.

TABLE 1

| FIELD NAME | BYTES | DATA FORMAT |
|---|---|---|
| Image data ID | 4 | B |
| Image capture time | 2 | B |
| Image capture distance | 4 | B |
| Image capture method | 1 | B |
| Image capture angle | 2 | B |
| Image capture track length | 4 | B |
| Image capture image size | 8 | B |
| Image capture resolution | 8 | B |
| Image capture date/time | 8 | B |
| Image capture layout | 1 | B |
| Image capture source | 2 | B |
| Image capture shutter speed | 2 | B |
| Application ID | 1 | B |
| Application file name | 32 | A |
| Foreground image ID | 1 | B |
| Background image ID | 1 | B |
| Foreground character code ID | 1 | B |
| Foreground character information | 64 | A |
| Background character code ID | 1 | B |
| Background character information | 1 | B |
| Print count | 2 | B |
| Reserved | 43 | B |

The image data identification ID is for identifying image data photographed by the camera 2b of the imaging system 2 and is usually assigned as a serial number.

Image capture information is information relating to conditions of the imaging system 2 when the target object M is photographed (image captured) for example by the camera 2b. More specifically, as shown in Table 1, the image capture information can consist of the image capture time, image capture distance, image capture method, image capture angle, image capture track length, image capture image size, image capture resolution, image capture date/time, image capture layout, image capture source, and image capture shutter speed. Two bytes are assigned to the image capture time, the first byte indicates a two-digit integer and the second byte indicates two digits below the decimal point. For example, 0725h signifies image capture (photography) at 7.25 seconds. The image capture distance is shown by four byte integers (mm). The image capture method signifies an image capture method utilizing the camera 2b and distinguishes the image capture into image capture by re-centering, image capture by rotation, image capture by panning, and image capture by straight track, etc. The image capture angle is shown by an integer of two bytes and is the image capture angle versus the target object M of the camera 2b. The image capture track length is shown by an integer of four bytes. The image capture size consists of eight bytes, the upper four bytes indicate the image capture zone horizontal size (mm) and the lower four bytes indicate the image capture zone vertical size (mm). The image capture resolution consists of eight bytes, the upper four bytes indicate the horizontal resolution (pixels) and the lower four bytes indicate the vertical resolution (pixels). The image capture date/time consists of eight bytes of which one byte is a dummy and the remainder indicates the year, month, day, hours, minutes and seconds. The image capture layout consists of one byte and signifies the horizontal/vertical rotation angle. The image capture source consists of two bytes, and for the camera 2b the upper one byte indicates the manufacturer ID, and the lower one byte indicates the model ID. The image capture shutter speed is assigned two bytes.

The application information consists of the application ID and the application file name. The user selects the, type of image to print out for the holographic stereogram by using the imaging control section 2c. The imaging control section 2c checks whether the user as selected a 3-dimensional print, a moving image print, a still image album print or a custom effect print such as a morphing, selects from the various image processing software in the software storage section, loads the software into the RAM and runs the software. An ID matching the selected application is provided as a one-byte application ID. The application file name is expressed within 32 characters in ASCII code and is a file name specified by the application ID for storing the file information required for printing in each application. In the case of a still image print, the number of still images to print and the file names for each still image are listed within the file specified by the application file name.

Composite image information is information for synthesizing the base images captured (photographed) by the imaging system 2. The image numbers for synthesizing the foreground or the background of the basic image data are respectively indicated by one byte.

The character information consists of foreground character code ID, a background character code ID, foreground character information and background character information. One byte each is assigned to the foreground character code ID and background character code ID, and the lower two bits for example specify character codes such as ASCII, SJIS and Unicode, and the upper six bits are used to specify the 64 font types.

The foreground character information and background character information identified by the character code ID are expressed with 64 bytes each and a null character is the terminator character.

Two bytes are assigned to the print count information and show the number of print outs of the holographic stereogram by the hologram printer 4.

The above base image data is appended to the control file information holding the control information described above, and sent to the hologram printer 4 by way of the transmission path 3. The hologram printer 4 makes printouts of the holographic stereogram based on the control information file sent along the transmission path 3. The hologram printer 4 at this time incorporates items such as the print count, optimized exposure information or the ID No. of the hologram. Optimizing to the exposure information is performed by optimizing the brightness of the look-up table and image, and the aspect ratio, based on the image capture conditions listed in the control information file.

Figure 3A:
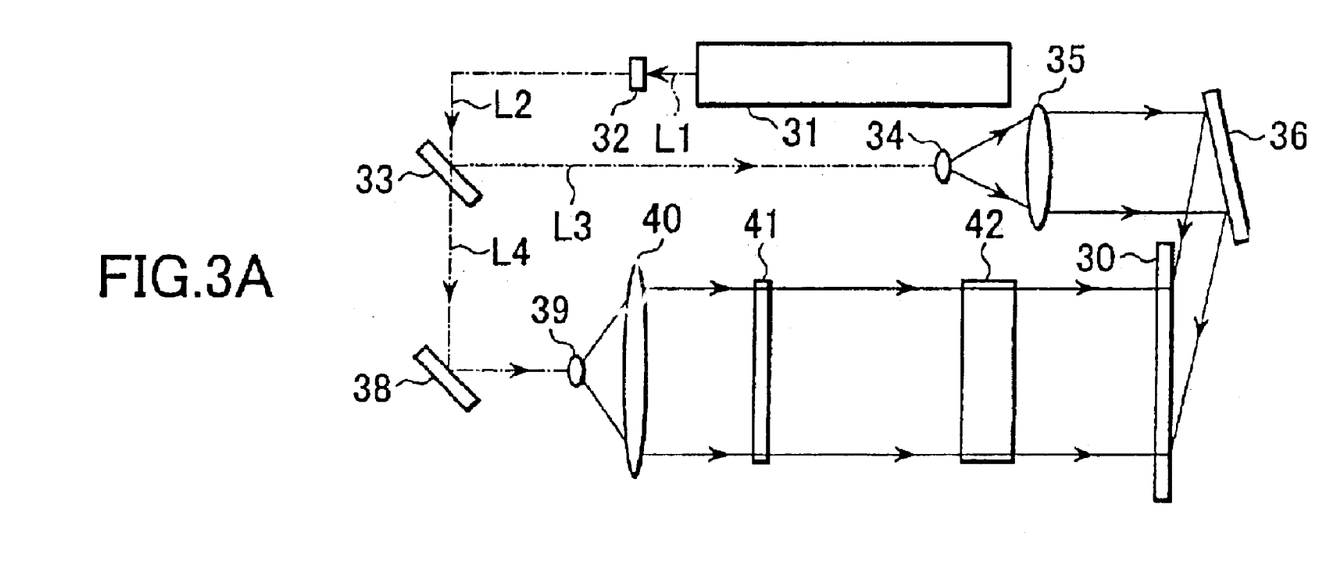
FIGS. 3A and 3B are drawings showing the structure of the hologram printer.
Figure 3B:
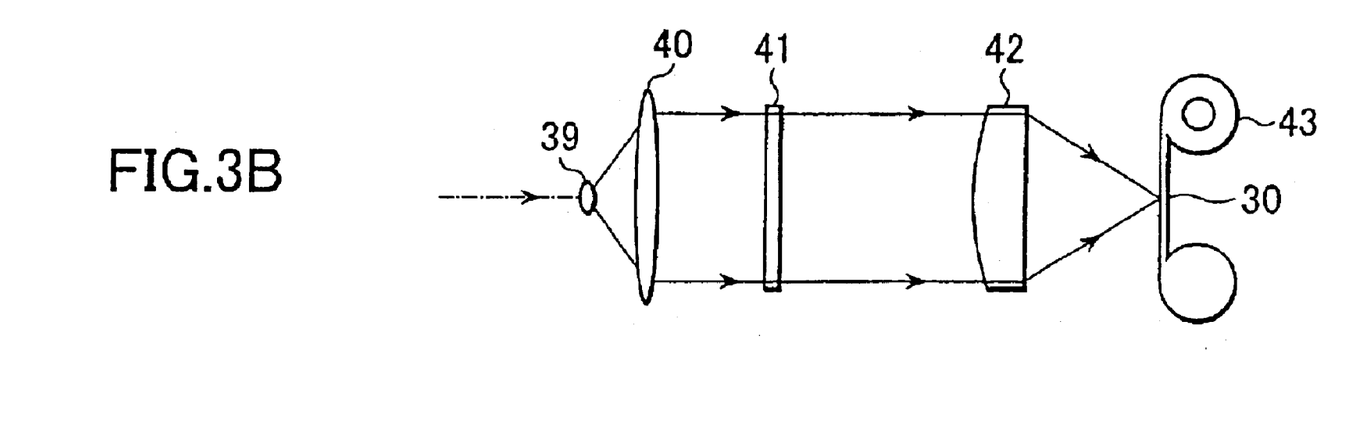
Figure 4:
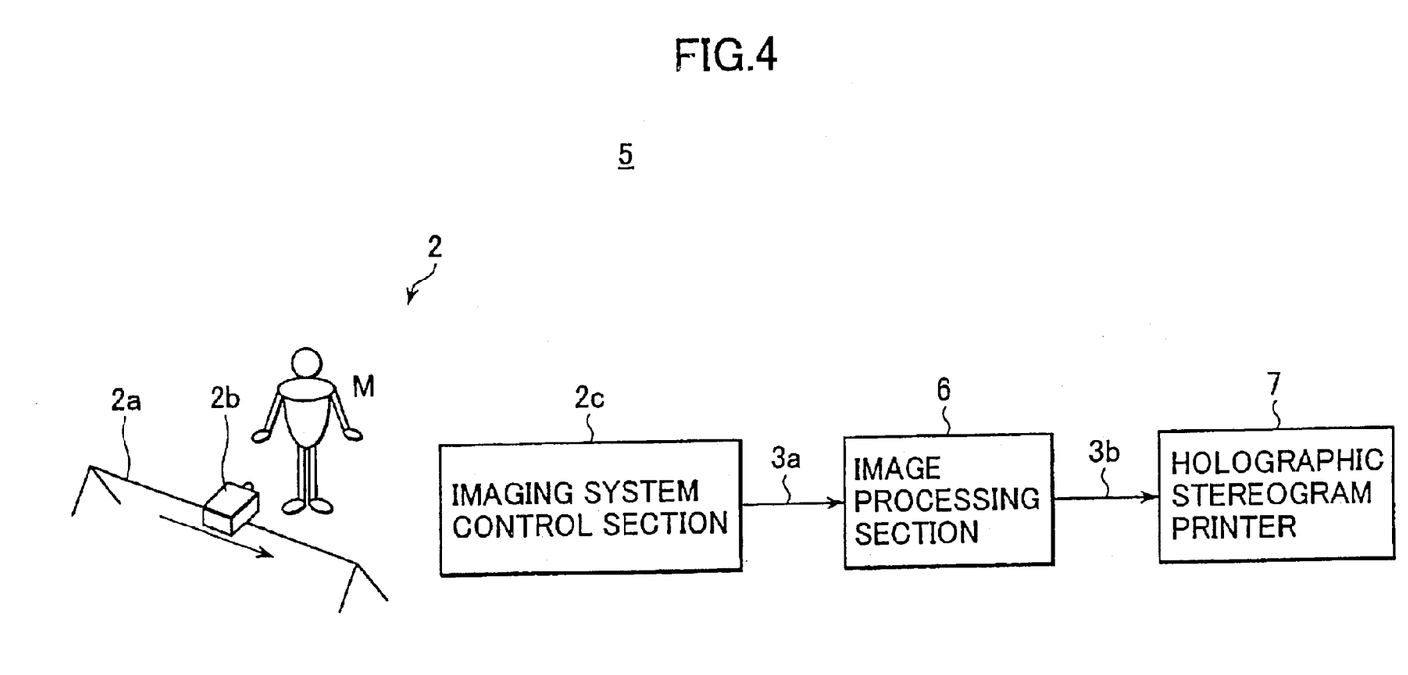
FIG. 4 is a block diagram showing the structure of an adaptation of the holographic stereogram printing system of the invention.
Figure 5:
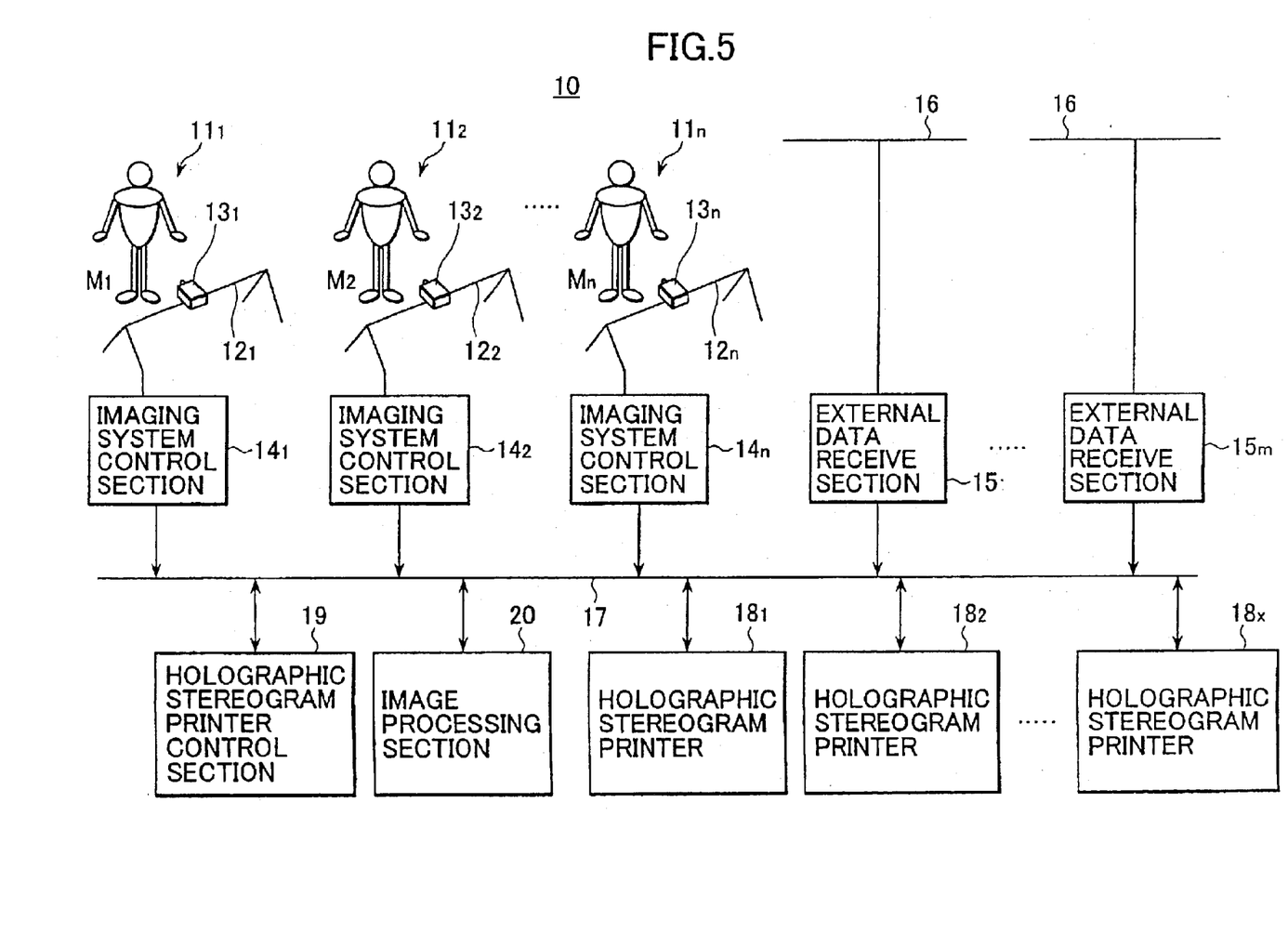
FIG. 5 is a block diagram showing the structure of the holographic stereogram printing system according to the second embodiment of the invention.

Next, the hologram printer 4 is described while referring to FIGS. 3A and 3B. FIG. 3A is a drawing of the optical system of the hologram printer 4 as seen from above. FIG. 3B is a drawing of an essential section of the optical system of the hologram printer 4 as seen from the side.

As shown in FIG. 3A, the hologram printer 4 comprises a laser lamp source 31 to beam a laser light of a specific wavelength, a half mirror 33, and an exposure shutter 32 installed along the optical axis of the laser light L1 from the laser lamp source 31.

The exposure shutter 32 is shut when light is not exposed on the hologram record medium 30, and is opened when light is exposed on the hologram record medium 30. The half mirror 33 has the job of separating the laser light L2 passing through the exposure shutter 32, into the reference light and target object light. The laser light L3 reflected from the half mirror 33 is the reference light, and the light L4 permeating through the half mirror 33 is the target object light.

A reference light optical system consisting of a cylindrical lens 34, a collimator lens 35 for making the reference light a parallel beam, and a full reflecting mirror 36 for reflecting the light made into a parallel beam by the collimator lens 35 are installed in that order, on the optical axis of the light L3 reflected by the half mirror 33.

The light reflected by the half mirror 33 is first changed into dispersed light by the cylindrical lens 34, and then changed into a parallel light beam by the collimator lens 35. Afterwards the light is reflected by the full reflecting mirror 36 and beamed into the hologram recording medium 30.

In the drawings of FIGS. 3A and 3B on the other hand, the target object light optical system consists of a full reflecting mirror 38 reflecting the light permeating from the half mirror 33, a special filter 39 consisting of a convex lens and pinhole, a collimator lens 40 for making the target object light a parallel beam, a display device 41 for displaying the image for recording, and a cylindrical lens 42 for focusing the target object light on the hologram record medium 30 installed in that order along the optical path of the light L4 permeating through the half mirror 33.

After the full reflecting mirror 38 has reflected back the light L4 that permeated through the half mirror 31 the light from the point light source is diffused by the special filter 39. Next, the light is changed into a parallel beam by the collimator 40 and then beamed into the display device 41. The display device 41 here is a permeable type image display device consisting for example of a liquid crystal panel, and displays images based on image data sent from the imaging system 2. The light from the display device 41, after modulation according to the image shown on the display device 41 is input to the cylindrical lens 42.

The light passing through the display device 41 is condensed laterally by the cylindrical lens 42, and that condensed light then is input as the object light to the hologram recording medium 30. In other words, in the hologram printer 4, the projected light from the display device 41 is input to the hologram recording medium 30 as object light of a rectangular shape.

The reference light is beamed onto the main surface of the hologram recording medium 30, and the object light is beamed onto the other main surface of the hologram recording medium 30. In other words, along with the reference light being input at a specified angle to one main surface of the hologram recording medium 30, object light is input to the other main surface with an optical axis approximately perpendicular to the hologram recording medium 30. The reference light and object light therefore interfere on the hologram recording medium 30, and the resulting interference bands due to this interference are recorded as a refractive index on the hologram recording medium 30.

What is claimed is:

1. A holographic stereogram printing system comprising:
   image provision means for providing an image for a hologram and a control information file related to said image used in said hologram;
   printing means for printing out a holographic stereogram made based on said image according to said control information file; and
   image processing means for processing said image provided from said image provision means; wherein said control information file includes an attribute having a capture condition for capturing said image for said hologram and an identification code to be visually recognized when printed on said holographic stereogram, and
   said processing performed by said image processing means designates a position on which said identification code is printed on said holographic stereogram so as to allow recognition of said identification code when said holographic stereogram is viewed from a designated angle.

2. A holographic stereogram printing method comprising:

an image receive process of receiving an image used for a hologram and a control information file relating to said image;

a detection process of detecting said control information file; and a printing process of printing out a holographic stereogram made based on said image according to said control information file detected by said detection process; and image processing process of implementing specified processing on said image for hologram; wherein said image generated by said image processing means is printed through said printing process according to said control information file so as to allow recognition of an identification code included in said control information file when said holographic stereogram is viewed from a designation angle.

3. A holographic printing method according to claim 2, wherein said image receiving process receives via a network, said control information file and said image provided from a plurality of image provision means.

4. An imaging apparatus comprising:

imaging means for capturing an image for a hologram; and control information generation means for generating a control information file relating to the image for holograms captured by said image capture means, wherein said control information file generated by said control information generation means is added to said image captured by said image capture means wherein said control information file is recorded in a format with an identification number added to information relating to attributes of images and image capture conditions when said image was captured, and wherein said control information file contains angle designation information, said angle designation information defining an angle from which said identification number can be visually recognized.

* * * * *